United States Patent [19]
Morii et al.

[11] Patent Number: 5,218,200
[45] Date of Patent: Jun. 8, 1993

[54] IMAGE SCANNER WITH TURNABLE REFLECTING PLATE FOR SCANNING OBJECTS AT DIFFERENT LOCATIONS

[75] Inventors: Tokuji Morii, Kouka; Koichi Omae, Nagaokakyo; Yasuhiro Okada, Takatsuki, all of Japan

[73] Assignee: Omron Corporation, Japan

[21] Appl. No.: 762,450

[22] Filed: Sep. 19, 1991

[30] Foreign Application Priority Data

Sep. 19, 1990 [JP] Japan ................................. 2-249653

[51] Int. Cl.[5] ............................................... H01J 3/14
[52] U.S. Cl. ..................................... 250/235; 355/45
[58] Field of Search ............... 250/234, 235, 236, 557; 359/225; 358/450, 453, 486, 487, 496; 355/44, 45; 354/77, 110

[56] References Cited

U.S. PATENT DOCUMENTS

| | | | |
|---|---|---|---|
| 3,592,539 | 7/1971 | Haslam et al. | 355/45 |
| 4,453,822 | 6/1984 | Lewis | 355/45 |
| 4,527,055 | 7/1985 | Harkless et al. | 250/234 |
| 4,870,294 | 9/1989 | Hasegawa | 250/235 |
| 5,063,606 | 11/1991 | Takamori | 358/453 |

*Primary Examiner*—David C. Nelms
*Assistant Examiner*—K. Shami
*Attorney, Agent, or Firm*—Dickstein, Shapiro & Morin

[57] ABSTRACT

An image scanner includes a reflecting plate which is turnable to selectively receive reflected light from an object to be scanned which may be positioned at two different locations. An object at one location can be scanned with one resolution while another object can be scanned at another location with different resolution. The two locations may be spaced at different distances from the reflecting plate to permit accommodation of a wide variety of scanned objects.

20 Claims, 6 Drawing Sheets

IMAGE SCANNER WITH TURNABLE REFLECTING PLATE FOR SCANNING OBJECTS AT DIFFERENT LOCATIONS

FIELD OF THE INVENTION

This invention relates to an image scanner which scans objects at selected locations or at selected portions of an imaging area, and, more particularly to an improved scanner which scans different types of objects.

BACKGROUND OF THE INVENTION

FIG. 5 shows a configuration of one example of an existing image scanner.

An object capable of transmitting light, such as a film 4, is placed on light table 5 to be scanned. A light source built into light table 5 is turned on, causing the object to be scanned to be illuminated from behind. The light from the object to be scanned 4 passes through zoom lens 2 and is focused onto area sensor 1. In this way, the images on the object to be scanned 4, i.e., letters, figures, and so on, can be read by area sensor 1.

If the object to be scanned is a sheet of paper on which letters and figures are printed, the light emitted by light table 5 would be interrupted if the object were placed on the table. Instead, light sources 3 are lit, and their light illuminates the object to be scanned from above. The light reflected by the object to be scanned passes through zoom lens 2 and is focused onto area sensor 1. The angle of the field of view of zoom lens 2 is set to conform to the size of the page.

FIG. 6 shows another example of an existing scanner. The components of this scanner which have counterparts in FIG. 5 have been given the same reference numbers, and will not be again described. In this scanner, line sensor 11 is used as the sensor, and an interchangeable lens 12 is used as the lens. All other components are identical to those of the scanner in FIG. 5.

Line sensor 11 can read only the images on a given line, one line at one time. For this reason, object 4 is scanned in the additional direction indicated by arrows in FIG. 6. This allows the scanner to read all the images contained on object 4. Interchangeable lens 12 can be replaced so as to achieve a given resolution when an object to be scanned 4 is changed from a film to a printed page or vice versa.

As described above, existing image scanners deal with the problem of scanning objects with different resolution by readjusting the angle of the field of view of zoom lens 2, each time the resolution is changed, or by replacing the lens 12. These methods have problems when a variety of objects need to be scanned, as it consumes a great deal of time to change the equipment to accommodate the type of object to be scanned.

SUMMARY OF THE INVENTION

The present invention has been devised to eliminate lens replacement or readjustment for different types of scanned objects, thereby reducing scanning time when different types of objects are to be scanned.

The image scanner of this invention comprises: a sensor which reads the object to be scanned; an optical system which conducts light from the object to be scanned to the sensor; and, a turnable reflector plate which is able to selectively conduct light from a scanned object, when it is at one of at least two different scanning locations, relative to the sensor.

With an image scanner of the invention, an object to be scanned which consists of film or a film-like substance can be placed in one location, while an object to be scanned which consists of a printed page or the like can be placed in a different location. Because the reflector plate can turn, the light from the objects in both locations can be selectively reflected to the sensor. This arrangement avoids having to readjust or replace lenses for different types of scanned objects and allows objects to be scanned more swiftly and efficiently than is possible with existing scanners.

The above and other objects, features and advantages of the invention will be more readily understood from the following detailed description of the invention which is provided in connection with the accompanying drawings.

DETAILED DESCRIPTION OF THE INVENTION

Figure 1:
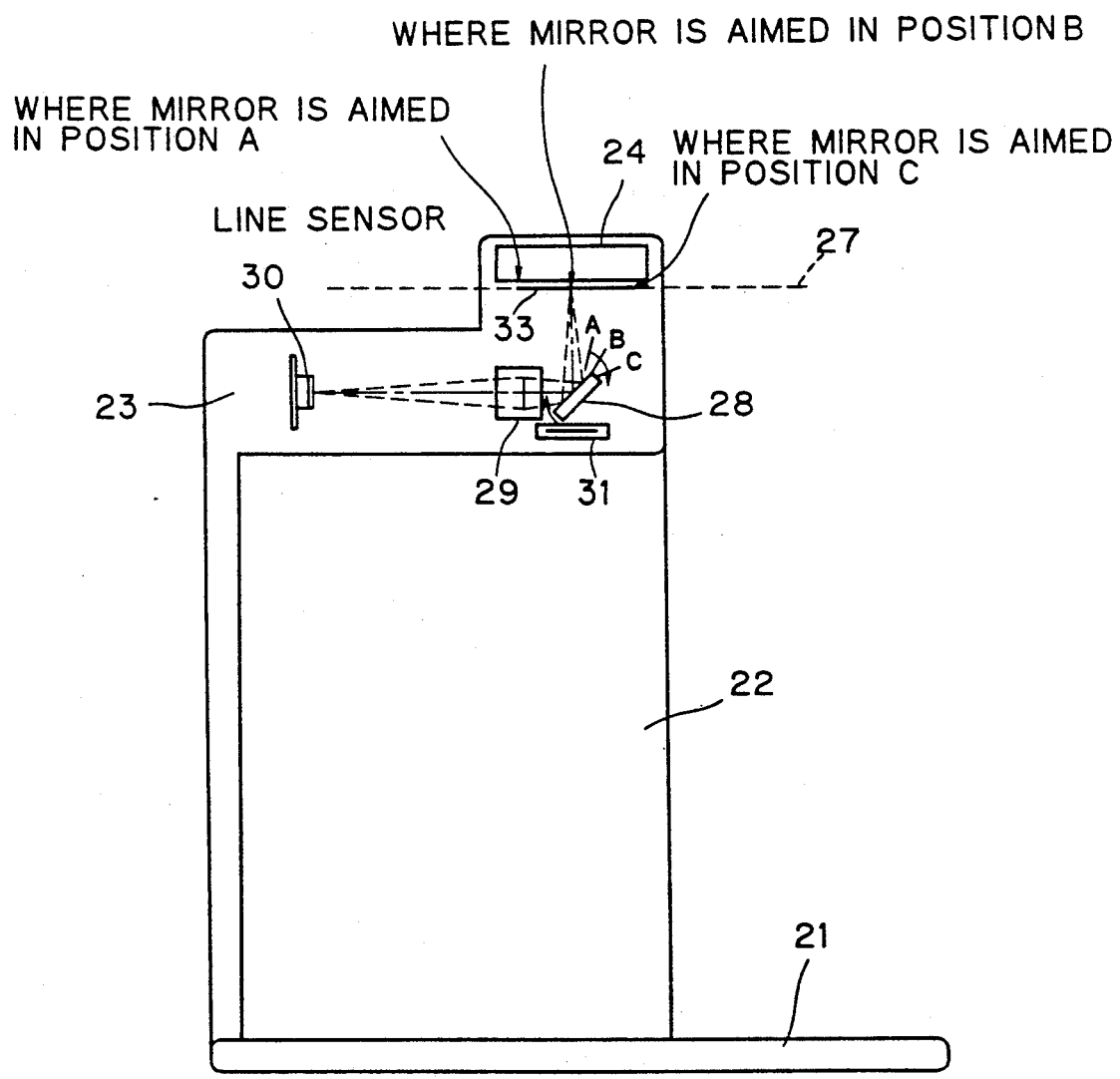
FIG. 1 is a side view showing its use in scanning an object in one location of an embodiment of the image scanner of this invention.

FIGS. 1 through 4 illustrate an embodiment of the image scanner of this invention.

A scanner unit 23 is attached to the top of a table 21 by means of a support plate 22. An object to be scanned consisting of a printed page 32 or the like may be placed on the table. The table 21 thus supports an object to be scanned. Scanner unit 23 has a slit 26 through which another object to be scanned consisting of a film 27 or the like can be inserted. An object 27, which has been inserted by a roller (not shown), moves between diffuse light source 24 and transparent glass panel 33. The light from light source 24 illuminates the inserted object 27 from above.

A reflector plate 28, which provides a light reflecting surface and which is preferably in the form of a mirror, is installed in scanner unit 23 below light source 24 in such a way that it can turn freely by a rotation drive mechanism, such as a motor. Lens 29 forming part of an optical system focuses the light reflected by reflector plate 28 onto a line sensor 30. Lens 31, which functions as a wide angle lens, also forms part of an optical system and consists primarily of a magnifying lens and an f 8 lens. This lens is placed below reflector plate 28 that is, on the same side of reflector plate 28 as table 21.

Figure 2:
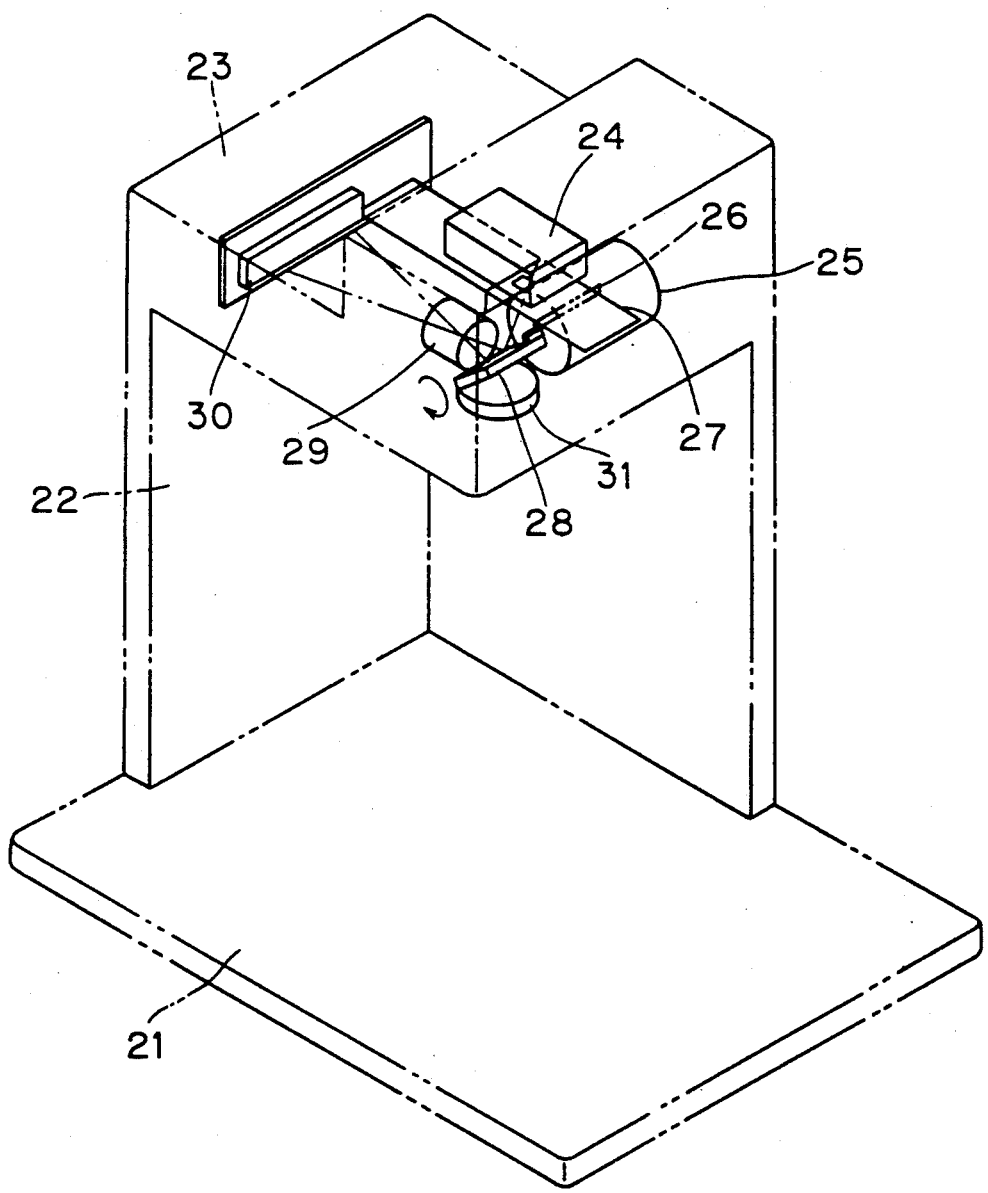
FIG. 2 is a perspective view of the FIG. 1 arrangement.

As is shown in FIGS. 1 and 2, an object to be scanned 27, such as a transparent substance like a 35mm film, may be inserted through slit 26 into scanner unit 23. The roller (not shown) then revolves, and object 27 is conveyed from right to left between diffuse light source 24 and glass plate 33, as shown in FIG. 1. The light emitted by light source 24 passes through the object to be scanned 27 and glass plate 33, and strikes reflector plate 28. The reflector plate reflects this light in the direction of lens 29. This lens focuses the light which strikes it on line sensor 30.

Line sensor 30 reads the images on a specified line of the object to be scanned 27. Because object 27 is conveyed in a scanning direction, all the images on it can be read with high resolution (for example, 2000 DPI).

Instead of moving the object to be scanned 27, object to be scanned 27 can be halted below diffuse light source 24, and reflector plate 28 can be turned to assume, sequentially, the scan positions shown in FIG. 1 as A, B and C. In this way, too, all the images on object 27 can be read in area or line-by-line sequence.

Figure 3:
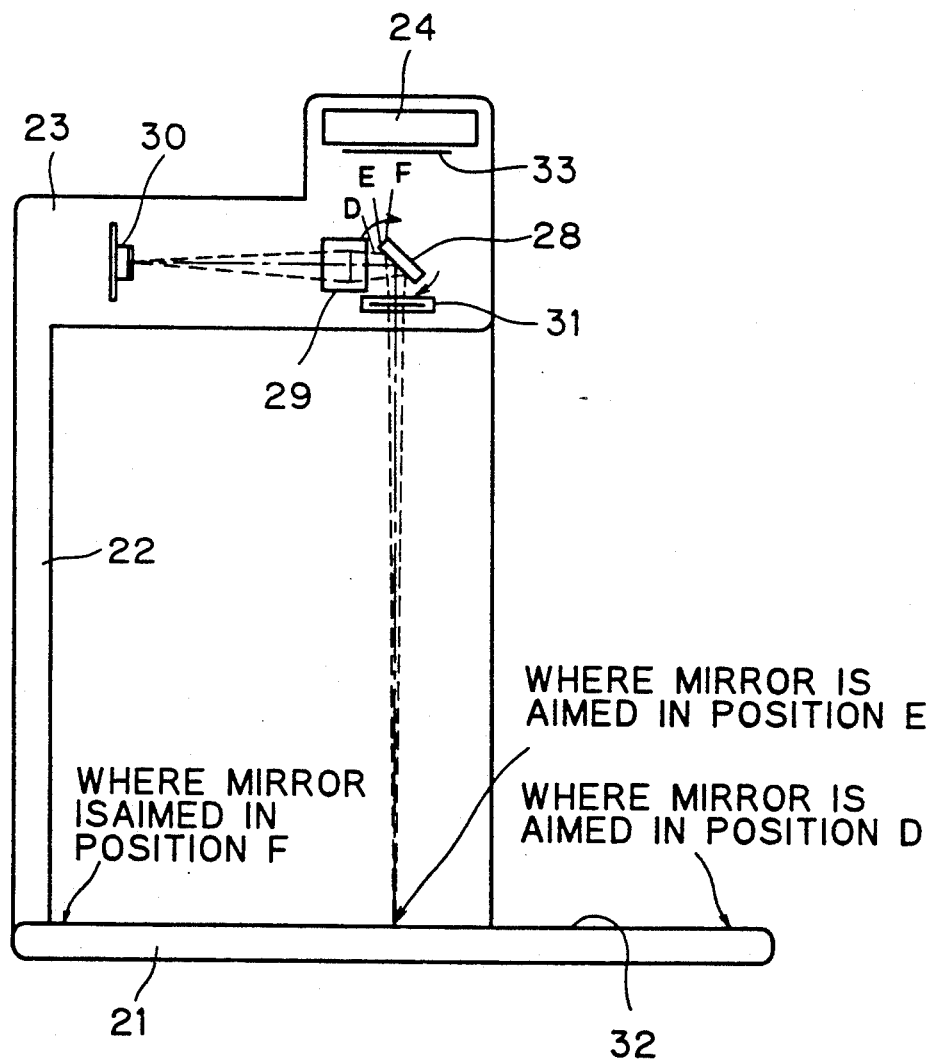
FIG. 3 is a side view of the FIG. 1 embodiment showing its use in scanning an object in another location.
Figure 4:
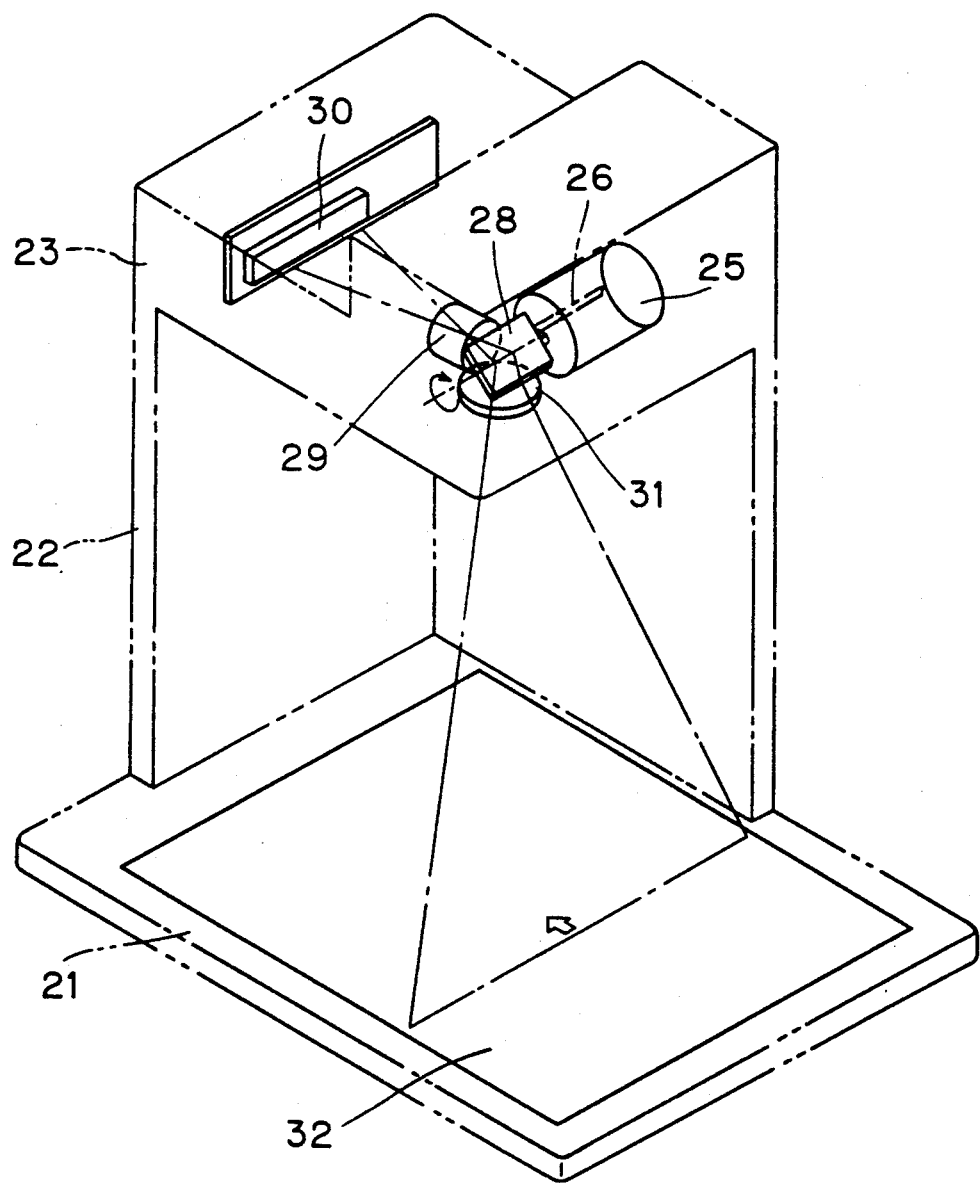
FIG. 4 is a perspective view of the FIG. 3 arrangement.
Figure 5:
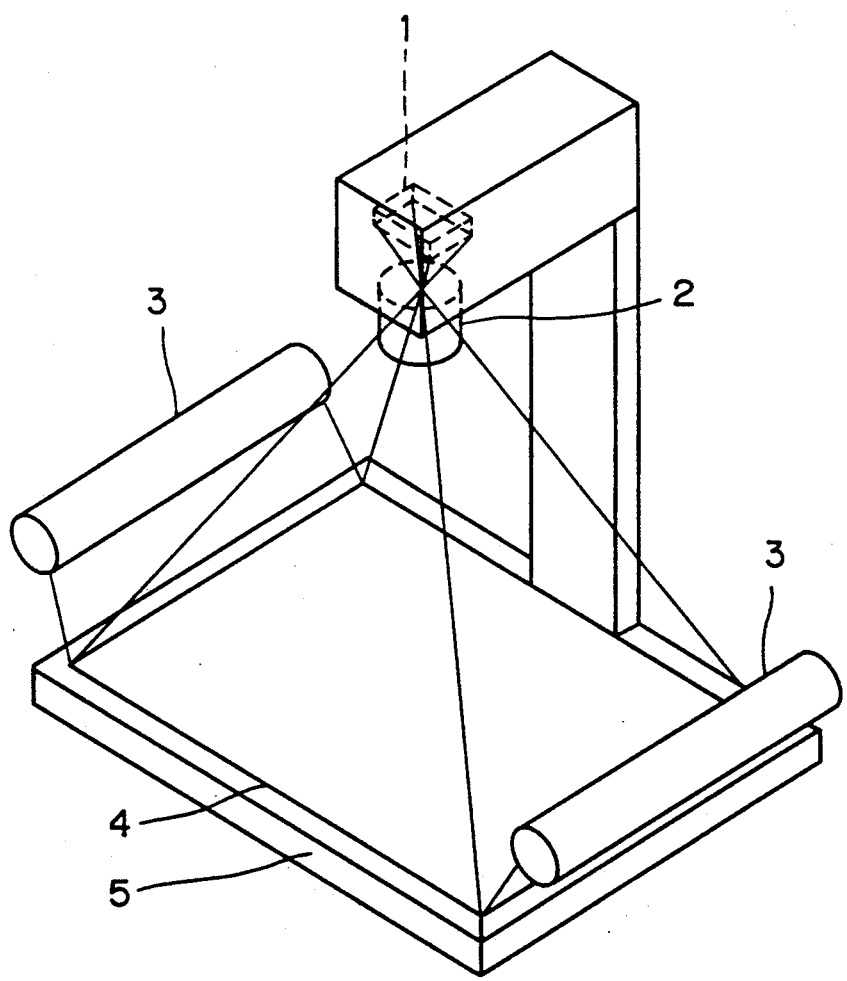
FIG. 5 is a perspective view of a configuration of one example of existing image scanners.
Figure 6:
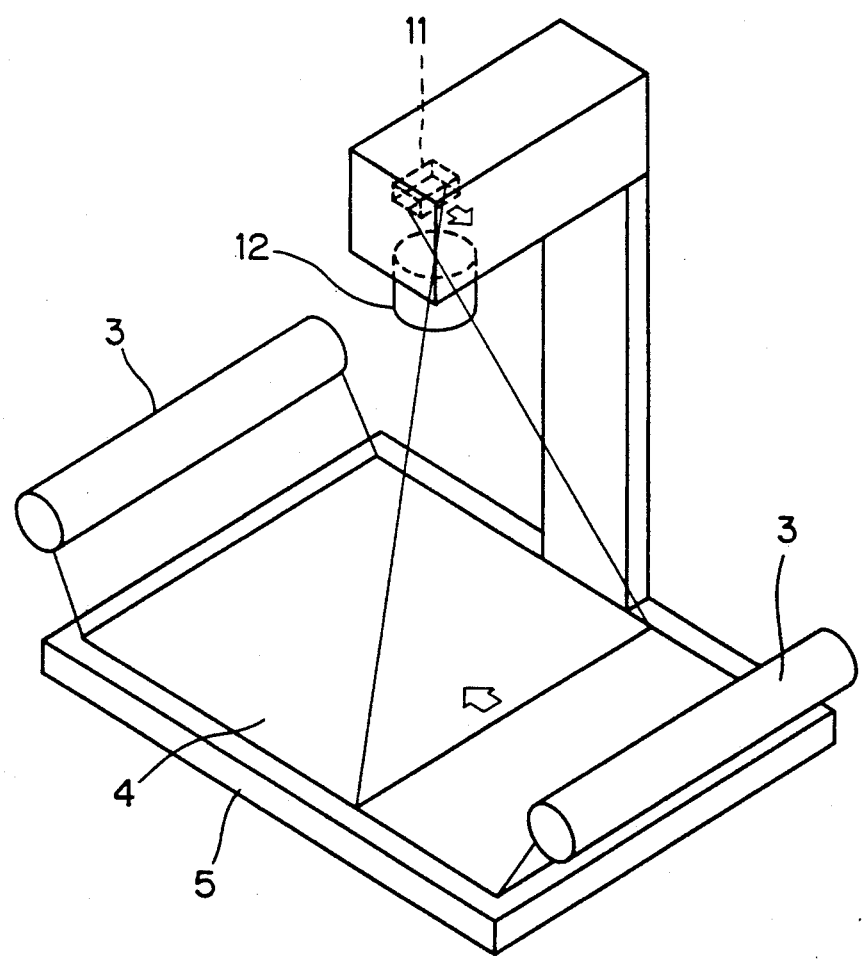
FIG. 6 is a perspective view of a configuration of another example of existing image scanners.

If the object to be scanned 32 is composed of a substance which does not transmit light, such as paper on which text and figures have been printed. This object is placed on table 21, as shown in FIGS. 3 and 4. When the object 32 is then scanned, reflector plate 28 is rotated counterclockwise about a pivot axis by a specified degree. In this way the light reflected by object 32 is made to pass through lens 31 and strike reflector plate 28. This same light is reflected to lens 29, which transmits and focuses it on line sensor 30. If the ambient light striking object 32 is insufficient, a light source to illuminate this object can be mounted on support panel 22.

Because the object to be scanned 32 is larger than object to be scanned 27, the latter is not moved about on table 21. Rather, reflector plate 28 is turned over specified angles of rotation, labeled D, E and F in FIG. 3. In this way all the images on the object to be scanned 32 can be read at a lower resolution (for example, 400 DPI) than is required for scanning object 27.

The focal points of lenses 29 and 31 can be fixed on a specified location before the scanner is used. This makes it unnecessary to readjust the focal points no matter what object is to be scanned. As a result, scanning can be performed more quickly.

The above discussion concerned the scanning of two objects at different resolutions. It is, of course, also possible to use this invention to scan two objects at the same resolution.

Rotation of the turnable reflector plate for purposes of selecting an object to be scanned at one of the two scanning locations can be done manually by extending the pivot axis for reflector plate 28 outside of scanner unit 23, or preferably by a motor or the like. Rotation of the turnable reflector plate for purposes of scanning an object is preferably accomplished with a motor.

As has been described above, the image scanner of this invention has a rotating reflector plate which can relay the light from an object placed at a first predetermined position as well as that from an object placed at a second predetermined position to a sensor. Thus, while the object in the first position is being scanned, a second object can be arranged in the second position. The focal points of the optical system can be set at given positions before the scanner is used and fixed there. These characteristics make it possible to perform scanning more rapidly.

Although the invention has been described as having two scanned locations, it should be evident that more than two scanned locations can be provided. In addition, each location may be at a respective distance from the turnable plate 27.

While a concrete embodiment of the invention has been described and illustrated, it should be apparent that many modifications can be made without departing from the spirit and scope of the invention. Accordingly, the invention is not limited by the specific embodiment which is described and illustrated, but is only limited by the scope of the appended claims.

What is claimed is:

1. An image scanner comprising:
    a sensor for reading an object to be scanned;
    a first object support for supporting an object to be scanned, said first support being positioned at a first scanning location;
    a second object support for supporting an object to be scanned, said second support being positioned at a second scanning location;
    a turntable reflector plate for selectively reflecting light from an object supported by said first support and for reflecting light from an object supported by said second support;
    means for turning said reflector plate so that it selectively reflects light from an object supported by one of said first and second supports; and
    an optical system for conducting reflected light from said turnable reflector plate to said sensor.

2. An image scanner as in claim 1 further comprising a member interconnecting said first and second supports.

3. An image scanner as in claim 1, wherein said first and second supports are located on opposite sides of said turnable reflecting plate.

4. An image scanner as in claim 1, wherein at least one of said object supports includes means for moving an object to be scanned relative to said at least one of said supports during a scanning operation, said turnable plate remaining stationary during said scanning operation.

5. An image scanner comprising:
    a sensor for reading an object to be scanned;
    a first object support for supporting an object to be scanned, said first support being positioned at a first scanning location;
    a second object support for supporting an object to be scanned, said second support being positioned at a second scanning location;
    a turnable reflector plate for selectively reflecting light from an object supported by one of said first and second supports;
    means for turning said reflector plate so that it selectively reflects light from an object supported by one of said first and second supports; and
    an optical system for conducting reflected light from said turnable reflector plate to said sensor;
    wherein at least one of said supports includes means for stationarily supporting an object to be scanned during a scanning operation and said means for turning causes said reflector plate to turn and reflect light from different portions of a stationary object to be scanned during a scanning operation.

6. An image scanner as in claim 1, wherein said first and second supports are located at different distances from said reflecting plate.

7. An image scanner as in claim 1, wherein one of said first and second supports is a table and the other of said supports is supported above said table, said turnable plate being located between said supports, one of said supports being located closer to said turnable plate than the other.

8. An image scanner as in claim 7, wherein said sensor, optical system, turnable plate, and other object support are located in a scanner unit supported above said table.

9. An image scanner as in claim 8, wherein said scanner unit is supported to said table by a member interconnecting said scanner unit and table.

10. An image scanner as in claim 9, wherein said other support includes associated means for moving an object to be scanned relative thereto during a scanning operation.

11. An image scanner as in claim 7, further comprising a lens provided between at least one of said first and second supports and said turnable plate.

12. An image scanner as in claim 11, wherein said lens is provided between at least said table and said turnable plate.

13. An image scanner as in claim 7, further comprising a light source provided to illuminate an object located at least one of said first and second supports.

14. An image scanner as in claim 13, further comprising a respective light source provided to illuminate an object located at each of said first and second supports.

15. An image scanner as in claim 13, wherein said sensor, optical system, turnable plate, and said other support are located in a scanner unit supported above said table.

16. An image scanner as in claim 15, wherein said light source is provided at least at said table.

17. An image scanner as in claim 8, wherein said sensor and optical system form a first light path direction which is substantially perpendicular to the light path direction between said turnable plate and at least one of said first and second supports.

18. An image scanner as in claim 17, wherein said first light path direction is substantially perpendicular to the light path direction between said turnable plate and each of said first and second supports.

19. An image scanner as in claim 3, wherein said first object support includes a table for supporting a printed page, said second object support including a transparent panel for supporting a film, said image scanner further including a light source for transmitting light through the film and then through said transparent panel.

20. An image scanner as in claim 5, wherein said first object support includes a table for supporting a printed page, said second object support including a transparent panel for supporting a film, said image scanner further including a light source for transmitting light through the film and then through said transparent panel.

* * * * *